United States Patent
Ito et al.

(10) Patent No.: US 9,397,916 B2
(45) Date of Patent: Jul. 19, 2016

(54) COMMUNICATION DEVICE AND COMMUNICATION SYSTEM

(71) Applicant: KABUSHIKI KAISHA TOSHIBA, Tokyo (JP)

(72) Inventors: Masashi Ito, Kanagawa (JP); Tomonori Maegawa, Tokyo (JP); Keisuke Mera, Kanagawa (JP); Yu Kaneko, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/833,576

(22) Filed: Aug. 24, 2015

(65) Prior Publication Data

US 2016/0065435 A1 Mar. 3, 2016

(30) Foreign Application Priority Data

Aug. 26, 2014 (JP) ................. 2014-171716

(51) Int. Cl.
*H04L 7/02* (2006.01)
*H04L 12/26* (2006.01)
*H04J 3/06* (2006.01)
*H04L 7/04* (2006.01)

(52) U.S. Cl.
CPC ........... *H04L 43/0864* (2013.01); *H04J 3/0658* (2013.01); *H04J 3/0682* (2013.01); *H04L 7/041* (2013.01)

(58) Field of Classification Search
CPC .............. H04L 7/00; H04L 7/02; H04L 7/041
See application file for complete search history.

(56) References Cited

U.S. PATENT DOCUMENTS

| | | | | |
|---|---|---|---|---|
| 6,404,886 B1 * | 6/2002 | Yoshida | ................ | H04M 9/082 379/406.01 |
| 7,660,524 B2 * | 2/2010 | Kallstenius | .......... | H04B 10/071 398/3 |
| 8,473,638 B2 | 6/2013 | Aweya et al. | | |
| 2007/0127919 A1 * | 6/2007 | Kallstenius | .......... | H04B 10/071 398/25 |
| 2015/0207877 A1 | 7/2015 | Ito | | |

FOREIGN PATENT DOCUMENTS

| | | |
|---|---|---|
| JP | 2015-139074 | 7/2009 |
| JP | 2011-525308 | 9/2010 |

* cited by examiner

*Primary Examiner* — Jaison Joseph
(74) *Attorney, Agent, or Firm* — Nixon & Vanderhye, P.C.

(57) ABSTRACT

According to one embodiment, a communication device includes a clock to measure time, communication circuitry and processing circuitry. The communication circuitry transmits a request signal to the other communication device in a certain cycle, and receives a response signal transmitted in response to the request signal, from the other communication device. The processing circuitry changes a transmission timing of the request signal; compares first round-trip delay time with second round-trip delay time; and if a result of comparison shows that the second round-trip delay time is shorter than the first round-trip delay time, adjusts the time measured by the clock using a transmission time point of the second request signal and the reception time point of the second request signal in the other communication device, and the transmission time point of the second response signal from the other communication device and a reception time point of the second response signal.

14 Claims, 11 Drawing Sheets

COMMUNICATION DEVICE AND COMMUNICATION SYSTEM

CROSS-REFERENCE TO RELATED APPLICATIONS

This application is based upon and claims the benefit of priority from Japanese Patent Application No. 2014-171716, filed Aug. 26, 2014; the entire contents of which are incorporated herein by reference.

FIELD

Embodiments described herein relate to a communication device and a communication system.

BACKGROUND

In time synchronization, it is important to accurately estimate a communication delay occurring since a first terminal delivers a reference time until a second terminal receives the reference time and adjusts time. Some conventional time synchronizing devices exchange frames with counterparts a plurality of times, and select the least value from among a plurality of round-trip delay time values, to estimate the communication delay. However, when a constant delay occurs on one way communication of a round trip, the estimation accuracy of the communication delay inevitably deteriorates, and it is thus difficult to synchronize the time with high accuracy.

DETAILED DESCRIPTION

According to one embodiment, a communication device includes a clock to measure time, communication circuitry and processing circuitry.

The communication circuitry transmits a request signal to the other communication device in a certain cycle, and receives a response signal that is transmitted in response to the request signal, from the other communication device.

The processing circuitry changes a transmission timing of the request signal.

The processing circuitry compares first round-trip delay time with second round-trip delay time. The first round-trip delay time relates to a time period obtained by subtracting signal processing time required in the other communication device after reception of a first request signal until transmission of a first response signal, from a time period after the transmission of the first request signal until the reception of the first response signal. The first request signal is the request signal before of change of the transmission timing, and the first response signal is the response signal transmitted in response to the first request signal.

The second round-trip delay time relates to a time period from transmission of a second request signal until reception of a second response signal, the second request signal being the request signal after change of the transmission timing, the second response signal being the response signal transmitted in response to the second request signal, and the second response signal containing information representing a reception time point of the second request signal in the other communication device and information representing a transmission time point of the second response signal from the other communication device.

The processing circuitry, if a result of comparison by the processing circuitry shows that the second round-trip delay time is shorter than the first round-trip delay time, adjusts the time measured by the clock using a transmission time point of the second request signal and the reception time point of the second request signal in the other communication device, and the transmission time point of the second response signal from the other communication device and a reception time point of the second response signal.

Embodiments of the present invention will be described below with reference to the drawings.

First Embodiment

Figure 1:
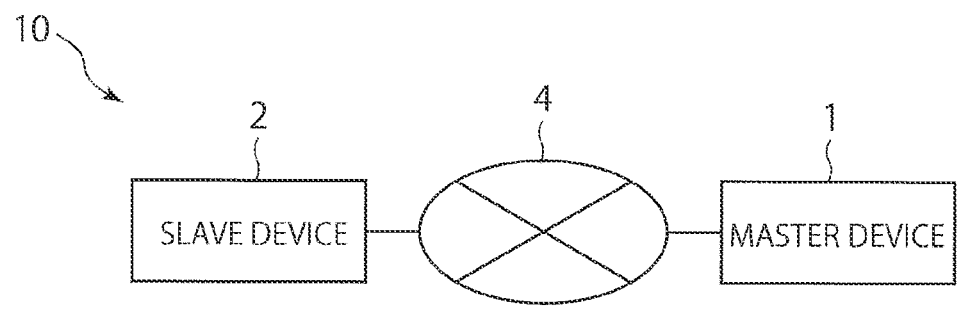
FIG. 1 is a configuration diagram of a communication system 10 in a first embodiment.

First, a first embodiment will be described. FIG. 1 is a diagram showing the configuration of a communication system 10 in the first embodiment. As shown in FIG. 1, the communication system 10 includes a master device (a first communication device) 1, and a slave device (a second communication device) 2 that is connected to the master device 1 via a communication network 4.

The master device 1 communicates with slave device 2 via the communication network 4. When receiving a request signal from the slave device 2 via the communication network 4, the master device 1 transmits a response signal to the slave device 2 via the communication network 4.

The slave device 2 communicates with the master device 1 via the communication network 4. The slave device 2 transmits a request signal to the master device 1 via the communication network 4, and receives a response signal that is transmitted in response to this request signal, from the master device 1 via the communication network 4. The slave device 2 then synchronizes the internal time thereof with the time of the master device 1.

Figure 2:
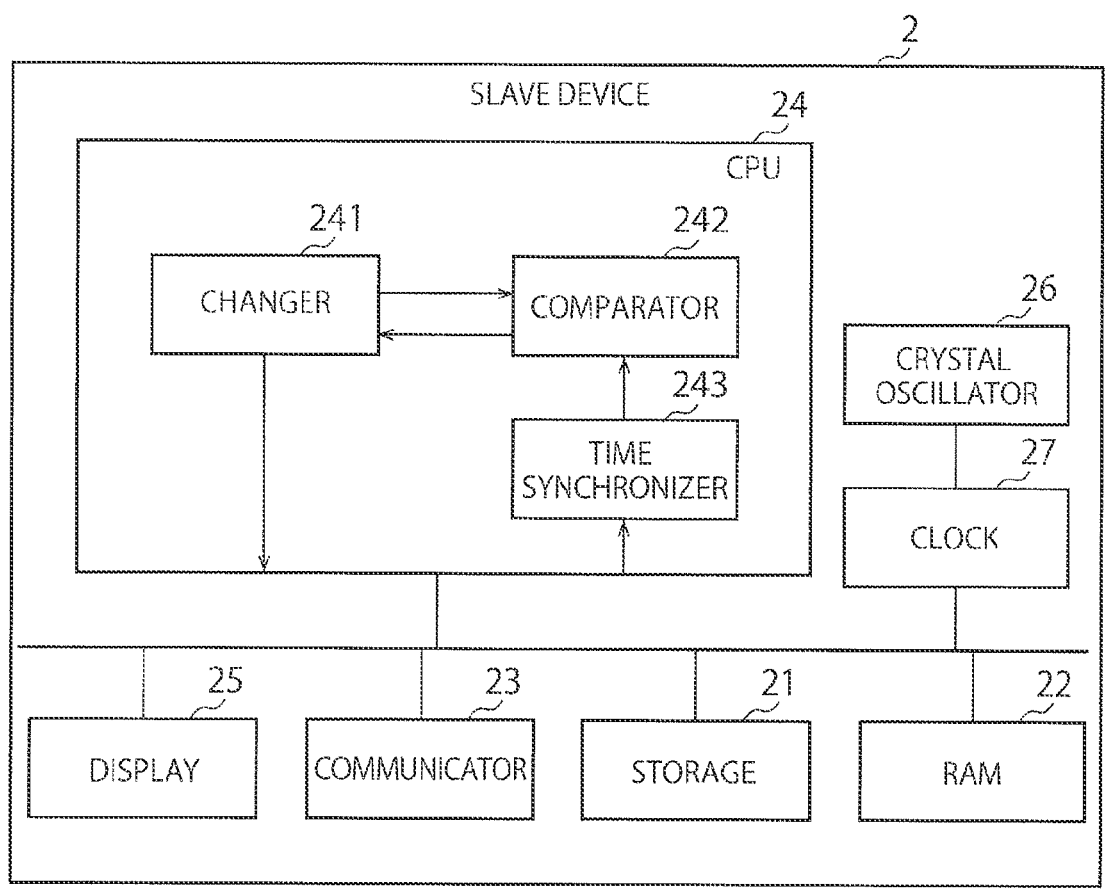
FIG. 2 is a configuration diagram of a slave device 2 in the first embodiment.

Subsequently, the configuration of the slave device 2 will be described with reference to FIG. 2. FIG. 2 is a diagram showing the configuration of the slave device 2 in the first embodiment. As shown in FIG. 2, the slave device 2 includes a storage 21, a RAM (Random Access Memory) 22, a communicator 23, a CPU (Central Processing Unit) 24, a display 25, a crystal oscillator 26, and a clock 27. All or some of the blocks of the slave device 2 may be configured by one or a plurality of circuitry as one example. As one example, the communicator 23 may be configured by circuitry such as communication circuitry, and the CPU 24 may be configured by processing circuitry. The communication circuitry and the processing circuitry may be same physical circuitry or different physical circuitry each other. Other configuration examples than those described herein are possible. The term "circuitry" may indicate one circuit, a plurality of circuits, or a system of circuits.

In the storage 21, various programs to be executed by the CPU 24 are saved.

The RAM 22 stores information temporarily.

The communicator 23 transmits a request signal to the master device 1 via the communication network 4 at a certain cycle, and receives a response signal that is transmitted in response to the request signal from the master device 1 via the communication network 4. Here, the response signal contains, for example, time synchronization information, and this time synchronization information contains a time point at which the master device 1 receives request signal and a time point at which the master device 1 transmits the response signal. In the present embodiment, the description will be made assuming as an example that the request signal is a synchronization frame, and the response signal is a synchronization frame.

The display 25 displays the information under the control of the CPU 24.

The crystal oscillator 26 creates a clock signal of a predetermined frequency, and outputs this clock signal to the clock 27.

The clock 27 measures time. For example, the clock 27 measures time using a clock signal that is input from the crystal oscillator 26.

The CPU 24 reads a program from the storage 21 into the RAM 22 and executes it to function as a changer 241, a comparator 242, and a time synchronizer 243.

The changer 241 changes the transmission timing of the request signal. More specifically for example, the changer 241 changes at least one of, for example, a phase in transmitting a request signal (hereafter, referred to as a transmission phase) or a cycle, to change the transmission timing of the request signal.

In addition, when the result of comparison by the comparator 242 shows that a second round-trip delay time is not shorter than a first round-trip delay time, the changer 241 changes the transmission timing of the request signal again.

The comparator 242 compares the first round-trip delay time with the second round-trip delay time, the first round-trip delay time relating to a time period that is obtained by subtracting a signal processing time period taken by the master device 1 from the reception of the first request signal until the transmission of the first response signal, from a time period from the transmission of a first request signal being a request signal before the changer 241 changes the transmission timing until the reception of the first response signal being a response signal that is transmitted in response to the first request signal, and the second round-trip delay time relating to a time period from the transmission of a second request signal being a request signal after the changer 241 changes the transmission timing until the reception of a second response signal being a response signal that is transmitted in response to the second request signal, the second response signal containing information representing the reception time point of the second request signal in the master device 1 and information representing the transmission time point of the second response signal in the master device 1. Here, as with the first round-trip delay time, the second round-trip delay time is, for example, a time period that is obtained by subtracting a signal processing time period taken by the master device 1 from the reception of the second request signal until the transmission of the second response signal, from a time period from the transmission of the second request signal until the reception of the second response signal.

The time synchronizer 243 adjusts the clock 27 so as to be synchronized in time with the master device 1. More specifically, if the result of comparison by the comparator 242 shows that the second round-trip delay time is shorter than first round-trip delay time, the time synchronizer 243 adjusts the time measured by the clock 27 using the transmission time point of the second request signal and the reception time point of the second request signal in the master device 1, and the transmission time point of the second response signal in the master device 1 and the reception time point of the second response signal.

Figure 3:
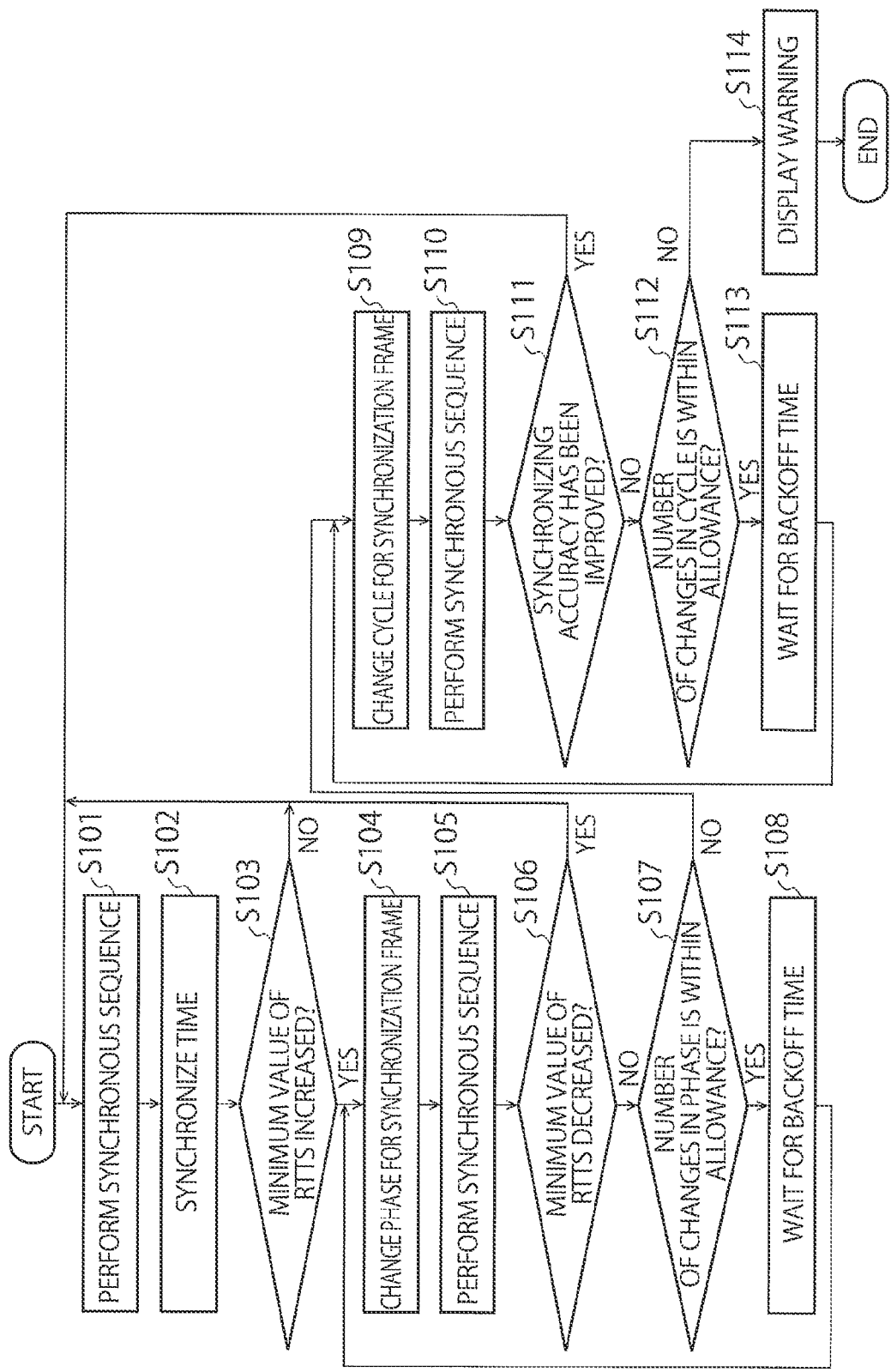
FIG. 3 is a flow chart showing an example of the operation of the slave device 2 in the first embodiment.

Subsequently, the operation of the slave device 2 will be described with reference to FIG. 3. FIG. 3 is a flow chart showing an example of the operation of the slave device 2 in the first embodiment.

(Step S101) First, the communicator 23 creates a synchronization frame in accordance with a predetermined transmission phase and cycle to perform a synchronous sequence. Here, the synchronous sequence is a series of processes in which the communicator 23 transmits the synchronization frame to the master device 1, and receives a synchronization frame transmitted from the master device 1 that has received this synchronization frame.

(Step S102) Next, the communicator 23 acquires time synchronization information contained in the synchronization frame received from the master device 1, and passes the time synchronization information to the time synchronizer 243. Here, the time synchronization information contains a time point $t_2$ at which the master device 1 receives the synchronization frame, and a time point $t_3$ at which the master device 1 transmits the synchronization frame.

Note that whenever the slave device 2 transmits a synchronization frame, the time synchronizer 243 causes the storage 21 to store the time point $t_1$ at which the slave device 2 transmits the synchronization frame, and whenever the slave device 2 receives a synchronization frame, causes the storage 21 to store a time point $t_4$ at which the slave device 2 receives the synchronization frame.

Next, the time synchronizer 243 calculates a communication delay "D" from the master device 1 up to the slave device 2 according to Expression (1).

[Expression 1]

$$D = \frac{(t_4 - t_3)_i + (t_2 - t_1)_j}{2} \qquad (1)$$

where, $i = \mathrm{argmin}_x\{(t_4 - t_3)_x\}$, $j = \mathrm{argmin}_y\{(t_2 - t_1)_y\}$ Here, indices "i" and "j" are calculated with respect to the N latest synchronization frames (N is a positive integer). Note that in the first through N−1 transmissions/receptions of the synchronization frames, the indices "i" and "j" are calculated based on the synchronization frames up to that point because the synchronization frames are not transmitted and received N times.

The time synchronizer 243 then calculates a time difference "Δt" from the master device 1 according to Expression (2), and advances the time measured by the clock 27 by the time difference "Δt."

[Expression 2]

$$\Delta t = t_4 - t_3 - D \quad (2)$$

Here, when advancing the time, the time may be advanced by the time difference "Δt" immediately, or the time may be gradually advanced over predetermined time so as to be advanced by the time difference "Δt" after the predetermined time. In such a manner, the time synchronizer 243 determines the time difference "Δt" from the master device 1 using the transmission and reception time points of the request signal and the transmission and reception time points of the response signal, and adjusts the time measured by the clock 27 based on the determined time difference "Δt."

Note that the process of step S102 may be performed after the completion of the N transmissions/receptions of the synchronization frames. In addition, in the present embodiment, the time difference "Δt" is determined using the time point $t_3$ at which the master device 1 transmits the synchronization frame and the time point $t_4$ at which the slave device 2 receives the synchronization frame, but this is not intended to limit the determination, and the time difference "Δt" may be determined using the time point $t_1$ at which the slave device 2 transmits the synchronization frame and the time point $t_2$ at which the master device 1 receives the synchronization frame.

(Step S103) Next, the comparator 242 compares a current round-trip delay, which is a minimum value of the round-trip delay time values (Round Trip Time: referred to as an RTT, hereafter) of the N latest synchronization frames at that point, with a past round-trip delay, which is a minimum value of the RTTs of the past N latest synchronization frames, to determine whether the current round-trip delay is increased to be longer than the past round-trip delay. Here, as an example, the N latest synchronization frames at that point and the past N latest synchronization frames share N−1 synchronization frames.

If it is determined that the current round-trip delay is not increased to be longer than the past round-trip delay (NO), the process returns to step S101, and the communicator 23 performs the synchronous sequence again. Here, a minimum value MinR of the RTTs is calculated according to Expression (3). Here, the minimum value MinR of the RTTs is twice the communication delay D.

[Expression 3]

$$MinR = (t_4 - t_3)_i + (t_2 - t_1)_j \quad (3)$$

where, $i = \mathrm{argmin}_x\{(t_4-t_3)_x\}$, $j = \mathrm{argmin}_y\{(t_2-t_1)_y\}$ Note that, in the present embodiment, it is assumed as an example that the N latest synchronization frames at that point and the past N latest synchronization frames share the N−1 synchronization frames, and the number of shared synchronization frames may be N−2 or less, or the number of shared synchronization frames may be zero.

(Step S104) If it is determined in step S103 that the current round-trip delay is increased to be longer than the past round-trip delay (YES in step S103), which means that a constant delay occurs, the changer 241 determines a new transmission phase for the synchronization frame, and notifies the determined transmission phase to the communicator 23 to change the transmission phase of the synchronization frame. Here, the transmission phase is, for example, a phase that is zero at the transmission start time of synchronization frame.

At this point, the amount of phase by which the changer 241 shifts from the current transmission phase to the newly determined transmission phase may be a predetermined amount, or may be a value determined at random. In addition, the changer 241 may determine a correction value for the transmission phase by performing a binary search, defining the cycle of the synchronization frame as a maximum value, until the minimum value of the RTTs becomes the least. More specifically for example, the changer 241 may shift the current transmission phase by a half cycle, ¼ cycle, ⅛ cycle, . . . in this order until the minimum value of the RTTs becomes the least.

(Step S105) Next, the communicator 23 performs the synchronous sequence at the transmission timing in accordance with the cycle and the newly determined transmission phase.

(Step S106) Next, the comparator 242 compares this minimum value of the RTTs with the past minimum value of the RTTs to determine whether this minimum value of the RTTs becomes less than the past minimum value of the RTTs. If this minimum value of the RTTs becomes less than the past minimum value of the RTTs (YES), the process returns to step S101, where the communicator 23 performs the synchronous sequence, and in step S102 the time synchronizer 243 adjusts the time measured by the clock 27. This allows the time synchronizer 243 to adjust the time measured by the clock 27 using the transmission time point of the request signal that is transmitted at the changed transmission timing and the reception time point of this request signal in the master device 1, and the transmission time point of the response signal in the master device 1 that is transmitted in response to this request signal and the reception time point of this response signal.

Here, the past minimum value of the RTTs is an example of the first round-trip delay time, and is the sum of the minimum value of differences between the transmission time points of the first request signals and the reception time points of the first request signals in the master device 1, and the minimum value of differences between the transmission time points of the first response signals in the master device 1 that are transmitted in response to the first request signals and the reception time points of the first response signals. Here, the first response signal contains information representing the reception time point of the first request signal in the master device 1, and information representing the transmission time point of the first response signal in the master device 1.

In addition, this minimum value of RTTs is an example of the second round-trip delay time, and is the sum of the minimum value of differences between the transmission time points of the second request signals and the reception time points of the second request signal in the master device 1, and the minimum value of differences between the transmission time points of the second response signals in the master device 1 that are transmitted in response to the second request signals and the reception time points of the second response signals.

In such a manner, if the result of comparison by the comparator 242 shows that the communication delay becomes short, the slave device 2 performs the following processes. The communicator 23 transmits a request signal at the changed transmission timing, and receives a response signal in response to this request signal. The time synchronizer 243 then adjusts the time measured by the clock 27 using the transmission and reception time points of the request signal after the change of the transmission timing or the transmission and reception time points of the response signal after the change of transmission timing.

(Step S107) If this minimum value of RTTs does not become less than the past minimum value of the RTTs in step S106 (NO in step S106), the number of changes in the transmission phase up to this point is counted, and it is determined whether the number of changes in the transmission phase up to this point is within the allowance.

(Step S108) If the number of changes in the transmission phase up to this point is determined to be within a predetermined allowance in step S107 (YES in step S107), the CPU 24 waits for randomly determined time (hereafter, referred to as Backoff time), and the process returns to step S104.

(Step S109) If it is determined in step S107 that the number of changes in the transmission phase up to this point is not within the allowance (NO in step S107), the changer 241 determines a new cycle for the synchronization frame, and notifies the determined cycle to the communicator 23 to change the cycle. At this point, the changer 241 may determine a value obtained by adding a predetermined value to the current cycle as the new cycle, or may determine a randomly determined value as the new cycle. In addition, the changer 241 may determine a correction value for the cycle by performing a binary search, defining the current cycle as a maximum value, until the minimum value of the RTTs becomes the least. More specifically for example, the changer 241 may reduce the current cycle to a half cycle, ¼ cycle, ⅛ cycle, . . . in this order until the minimum value of the RTTs becomes the least.

(Step S110) Next, the communicator 23 performs the synchronous sequence at the transmission timing in accordance with the new cycle and the transmission phase.

(Step S111) Next, the comparator 242 determines whether a synchronizing accuracy has been improved. For example, the comparator 242 calculates an estimated synchronizing-accuracy-improvement value according to Expression (4), and determines whether the synchronizing accuracy has been improved based on the calculated estimated synchronizing-accuracy-improvement value.

[Expression 4]

$$[\text{Estimated synchronizing accuracy improvement value}] = \frac{[\text{Decrement value of the minimum value of the } RTTs]}{2} - [\text{The amount of cycle prolongation}] \times [\text{Crystal oscillator accuracy}](\text{ppm}) \quad (4)$$

At this point, the comparator 242 determines, for example, that the synchronizing accuracy has been improved when the estimated synchronizing-accuracy-improvement value is positive, and determines that the synchronizing accuracy has not been improved when the estimated synchronizing-accuracy-improvement value is zero or less. If the synchronizing accuracy is determined to have been improved (YES in step S111), the process returns to step S101, the communicator 23 performs the synchronous sequence, and the time synchronizer 243 performs the time synchronization.

Here, the decrement value of the minimum value of the RTTs is a decrement from the minimum value of the RTTs before the cycle is changed to the minimum value of the RTTs after the cycle is changed. The first term in the right side of Expression (4) represents an estimated value of degree to which the minimum value of the RTTs is reduced and the communication delay accuracy is improved, since the estimation of the communication delay is a value obtained by dividing the minimum value of the RTTs by two.

In addition, the crystal oscillator accuracy (ppm: parts per million) is the accuracy of the crystal oscillator 26 included in the slave device 2, and the amount of cycle prolongation is an amount by which the cycle is prolonged in step S109.

In the present embodiment, on the assumption that the crystal oscillator accuracy is different between the slave device 2 and the master device 1, the prolongation of the cycle for the synchronization frame by the slave device 2 causes the prolongation of a time period during which the slave device 2 runs along depending on the value from the crystal oscillator 26. A time difference thus further arises between the slave device 2 and the master device 1 with the prolonged time of the cycle, and the synchronizing accuracy thereby deteriorates. For this reason, in Expression (4), the product of the amount of cycle prolongation and the crystal oscillator accuracy is defined as a negative factor for the estimated synchronizing-accuracy-improvement value. This product of the amount of cycle prolongation and the crystal oscillator accuracy is an approximate value of the deviation of the time points between the master device 1 and the slave device 2 that accompanies the amount of cycle prolongation. For example, in the case where the amount of cycle prolongation is 10 μs and the crystal oscillator accuracy is 10 ppm, the second term in the right side of Expression (4) means that deviation of the time points between the master device 1 and the slave device 2 is approximated to 100 μs.

Here, the accuracy of the crystal oscillator 26 may be a value provided from a vendor as a specification of the crystal oscillator 26, or may be a value that has been measured by experiments in advance. Note that, in the case of performing time synchronization to correct the frequency and the cycle count of the crystal oscillator 26, zero may be substituted for the value of the crystal oscillator accuracy in Expression (4).

(Step S112) If it is determined in step S111 that the synchronizing accuracy has not been improved (NO in step S111), the number of changes in the cycle up to this point is counted, and it is determined whether the counted number of changes in the cycle is within a predetermined allowance.

(Step S113) If it is determined in step S112 that the number of changes in the cycle is within the predetermined allowance (YES in step S112), the CPU 24 waits for the randomly determined time (the Backoff time), and the process returns to step S109.

(Step S114) If it is determined in step S112 that the number of changes in the cycle is not within the predetermined allowance (NO in step S112), the CPU 24 causes the display 25 to display information indicating a warning. Note that the CPU 24 may notify the information indicating a warning to the other device via the communication network 4.

As described above, according to this flow chart, the comparator 242 determines whether a second minimum value being the minimum value of the round-trip delay time values after the transmission timing is changed has been reduced from a first minimum value being the minimum value of the round-trip delay time values before the transmission timing is changed. Then, if it is determined that the second minimum value is not reduced from the first minimum value, the changer 241 changes the transmission timing of the request signal again. In contrast, if it is determined that the second minimum value is reduced from the first minimum value, the time synchronizer 243 adjusts the time measured by the clock 27. At this point, the time synchronizer 243 determines the time difference from the master device 1 using the transmission and reception time points of the request signal after the transmission timing is changed or the transmission and reception time points of the response signal after the transmission timing is changed, and adjusts the time measured by the clock 27 based on the determined time difference.

In addition, when the changer 241 prolongs the cycle for the request signal, the comparator 242 determines whether the synchronizing accuracy has been improved based on the decrement from the first round-trip delay time to the second round-trip delay time, the amount of cycle prolongation, and the accuracy of the crystal oscillator included in the slave device 2. If it is determined that the synchronizing accuracy has not been improved, the changer 241 changes the cycle for the request signal again. In contrast, if it is determined that the synchronizing accuracy has been improved, the time synchronizer 243 determines the time difference from the master device 1 using the transmission and reception time points of the request signal after the transmission timing is changed or the transmission and reception time points of the response signal after the transmission timing is changed, and adjusts the time measured by the clock 27 based on the determined time difference.

As described above, in the slave device 2 in the first embodiment, the clock 27 measures the time. The communicator 23 transmits a request signal to the master device 1 at a predetermined cycle, and receives a response signal that is transmitted in response to this request signal, from the master device 1. The changer 241 changes the transmission timing of the request signal. The comparator 242 determines the first round-trip delay time relating to a time period that is obtained by subtracting the signal processing time taken by the master device 1 from the reception of the first request signal until the transmission of the first response signal, from a time period from the transmission of the first request signal being a request signal before the changer 241 changes the transmission timing until the reception of the first response signal being a response signal that is transmitted in response to the first request signal. The comparator 242 determines the second round-trip delay time relating to a time period from the transmission of the second request signal being a request signal after the changer 241 changes the transmission timing until the reception of the second response signal being a response signal that is transmitted in response to the second request signal, the second response signal containing information representing the reception time point of the second request signal in the master device 1 and information representing the transmission time point of the second response signal in the master device 1. The comparator 242 then compares the first round-trip delay time with the second round-trip delay time.

If the result of comparison by the comparator 242 shows that the second round-trip delay time is shorter than the first round-trip delay time, the time synchronizer 243 adjusts the time measured by the clock using the transmission time point of the second request signal and the reception time point of the second request signal in the master device 1, and the transmission time point of the second response signal in the master device 1 and the reception time point of the second response signal.

The case where the transmission timing of the request signal is thereby changed and the communication delay is shortened means that a constant delay has been reduced or avoided on a transmission route of the request signal or a reception route of the response signal.

This allows the time synchronizer 243 to improve the estimation accuracy of the communication delay using the transmission and reception time points of the request signal after the transmission timing is changed and the transmission and reception time points of the response signal after the transmission timing is changed, which can improve the accuracy of the time synchronization.

Second Embodiment

Subsequently, a second embodiment will be described. In the first embodiment, the slave device 2 changes the transmission timing of the request signal, and if the result of comparison by the comparator 242 shows that the communication delay is shorter, adjusts the time measured by the clock 27 using the transmission and reception time points of the request signal after the transmission timing is changed or the transmission and reception time points of the response signal after the transmission timing is changed. In contrast, in the second embodiment, a master device collects the reception timings of request signals received from a plurality of slave devices, and determines the transmission timings of request signals from the respective slaves using the collected reception timings such that the transmission timings of synchronization signals from the respective slaves differ from one another.

Figure 4:
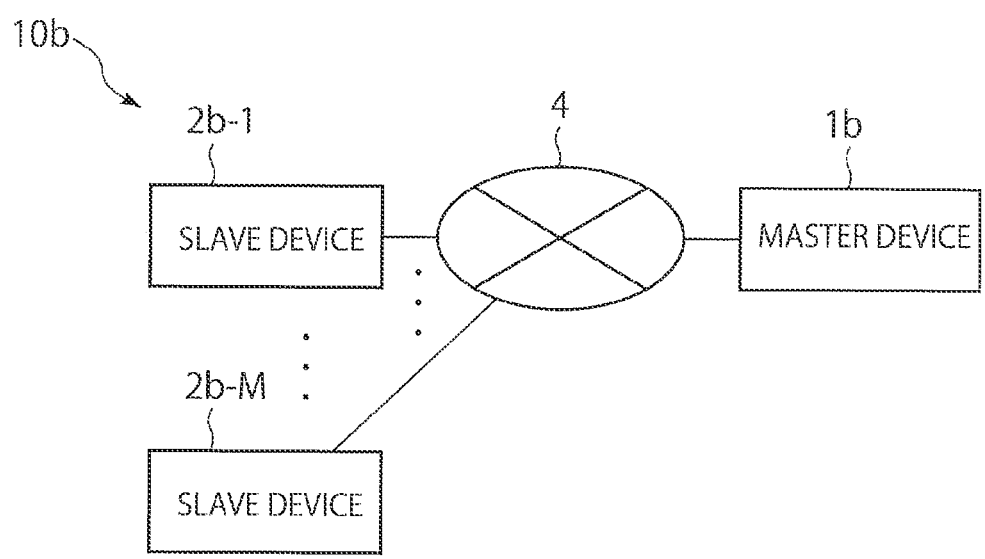
FIG. 4 is a configuration diagram of a communication system 10b in a second embodiment.

First, the configuration of a communication system 10b in the second embodiment will be described with reference to FIG. 4. FIG. 4 is a diagram showing the configuration of the communication system 10b in the second embodiment. As shown in FIG. 4, the communication system 10b includes master device 1b, and slave devices (second communication devices) 2b-1, . . . , 2b-M (M is a positive integer) connected to the master device (first communication device) 1b via the communication network 4.

The master device 1b communicates with slave devices 2b-1, . . . , 2b-M via the communication network 4. For example, when receiving request signals from the slave devices 2b-1, . . . , 2b-M via the communication network 4, the master device 1b transmits response signals to the slave devices 2b-1, . . . , 2b-M via the communication network 4.

The slave devices 2b-1, . . . , 2b-M communicate with the master device 1b via the communication network 4. For example, each of the slave devices 2b-1, . . . , 2b-M transmits a request signal to the master device 1b via the communication network 4, and receive a response signal that is transmitted in response to this request signal from the master device 1b via the communication network 4. Each of the slave devices 2b-1, . . . , 2b-M then synchronizes the internal time thereof with the time of the master device 1b. Hereafter, the slave devices 2b-1, . . . , 2b-M are collectively referred to as slave devices 2b.

Figure 5:
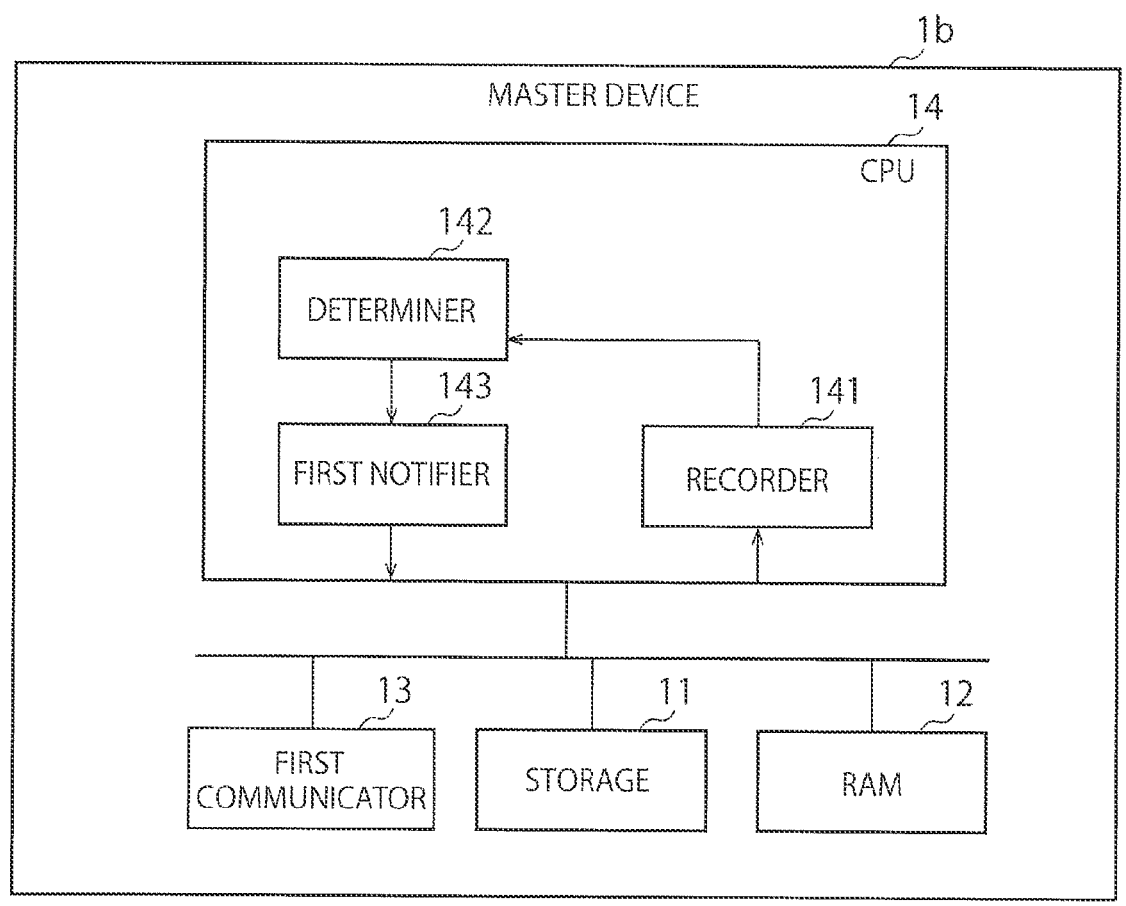
FIG. 5 is a configuration diagram of a master device 1b in the second embodiment.

Subsequently, the configuration of the master device 1b will be described with reference to FIG. 5. FIG. 5 is a diagram showing the configuration of the master device 1b in the second embodiment. As shown in FIG. 5, the master device 1b includes a storage 11, a RAM 12, a first communicator 13, and a CPU 14. All or some of the blocks of the master device 2 may be configured by one or a plurality of circuitry as one example. As one example, the communicator 13 may be configured by communication circuitry, and the CPU 14 may be configured by processing circuitry. The communication circuitry and the processing circuitry may be same physical circuitry or different physical circuitry each other. Other configuration examples than those described herein are possible. The term "circuitry" may indicate one circuit, a plurality of circuits, or a system of circuits.

In the storage 11, various programs to be executed by the CPU 14 are saved.

The RAM 12 stores information temporarily.

The first communicator 13 creates a frame loaded with time information, and transmits the frame to the slave devices 2b-1, . . . , 2b-M via the communication network 4. In addition, the first communicator 13 receives request signals from the plurality of second communication devices 2b-1, . . . , 2b-M.

The CPU 14 reads a program from the storage 11 into the RAM 12 and executes it to function as a recorder 141, a determiner 142, and a first notifier 143.

The recorder 141 records time points at which the first communicator 13 receives request signals from the plurality of slave devices 2b-1, . . . , 2b-M.

The determiner 142 determines transmission timing information to specify the transmission timings of the request signals of the plurality of respective slave devices 2b-1, . . . , 2b-M, such that the reception time points of the plurality of request signals received from the plurality of slave devices 2b-1, . . . , 2b-M differ from one another. Here, transmission timing information is cycles for the request signals, the transmission phases, correction values for the cycles, correction values for the transmission phases, time by which the transmission timings are shifted, the combination of them, or the like.

The first notifier 143 causes the response signals that are different from one another to contain the transmission timing information, and causes the first communicator 13 to transmit each response signal to the corresponding slave device 2b-i (i is an integer from one through M).

Figure 6:
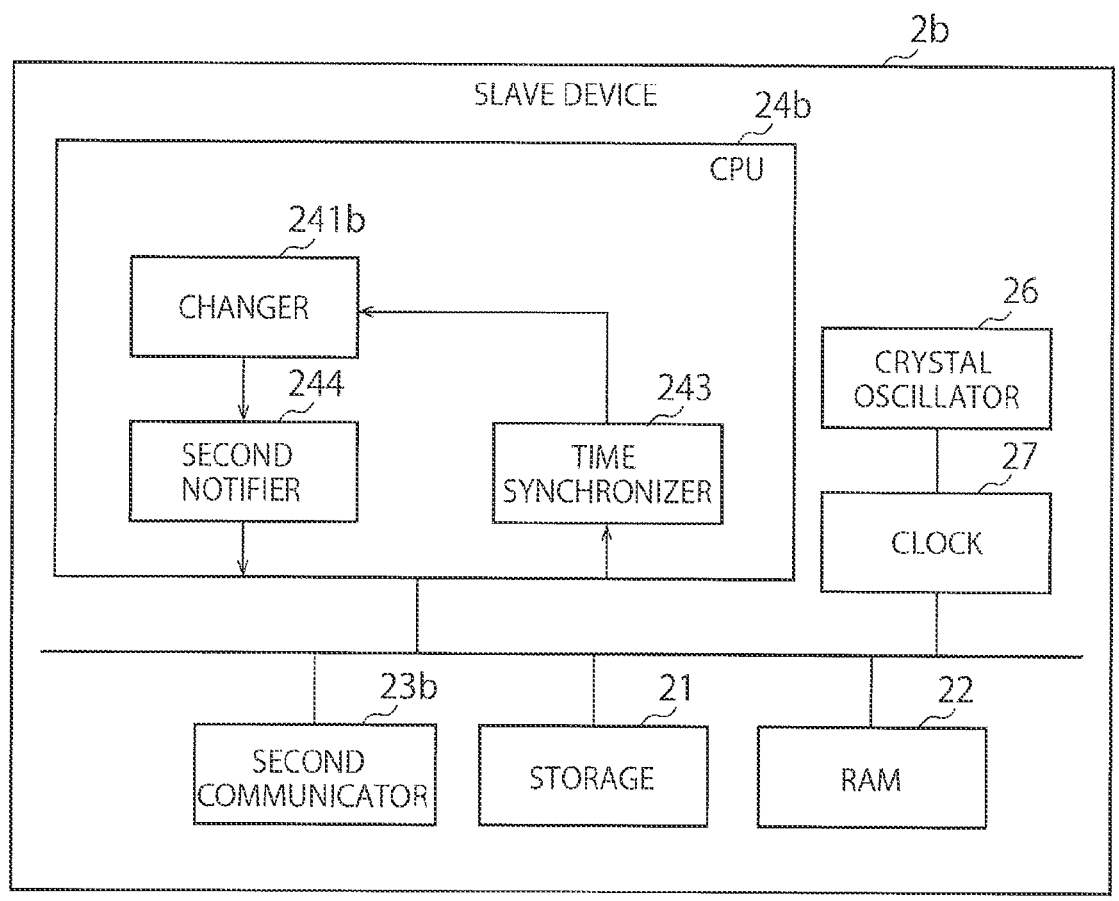
FIG. 6 is a configuration diagram of a slave device 2b in the second embodiment.

Subsequently, the configuration of the slave device 2b will be described with reference to FIG. 6. FIG. 6 is a diagram showing the configuration of the slave device 2b in the second embodiment. As shown in FIG. 6, the slave device 2b includes a storage 21, a RAM 22, a second communicator 23b, and a CPU 24b.

In the storage 21, various programs to be executed by the CPU 24b are saved.

The RAM 22 stores information temporarily.

The second communicator 23b transmits to the master device 1b a request signal to request a response from the master device 1b, and receives a response signal being a response to the request signal from the master device 1b. For example, the second communicator 23b creates a synchronization frame containing the latest RU, and transmits the created synchronization frame to the master device 1b via the communication network 4. In addition, the second communicator 2b receives a synchronization frame that the master device 1b transmits in response to this transmission, via the communication network 4.

The CPU 24b reads a program from the storage 21 into the RAM 22 and executes it to function as a changer 241b, a time synchronizer 243, and a second notifier 244.

The changer 241b changes the transmission timing of the request signal based on the transmission timing information contained in a response signal.

The time synchronizer 243 adjusts the time measured by the clock 27 so as to be synchronized in time with the master device 1b.

The second notifier 244 calculates a round-trip delay time from the transmission and reception time points of the request signal and the transmission and reception time points of the response signal, causes a request signal to contain the calculated round-trip delay time, and causes the second communicator 23b to transmit the request signal to the master device 1b.

Figure 7:
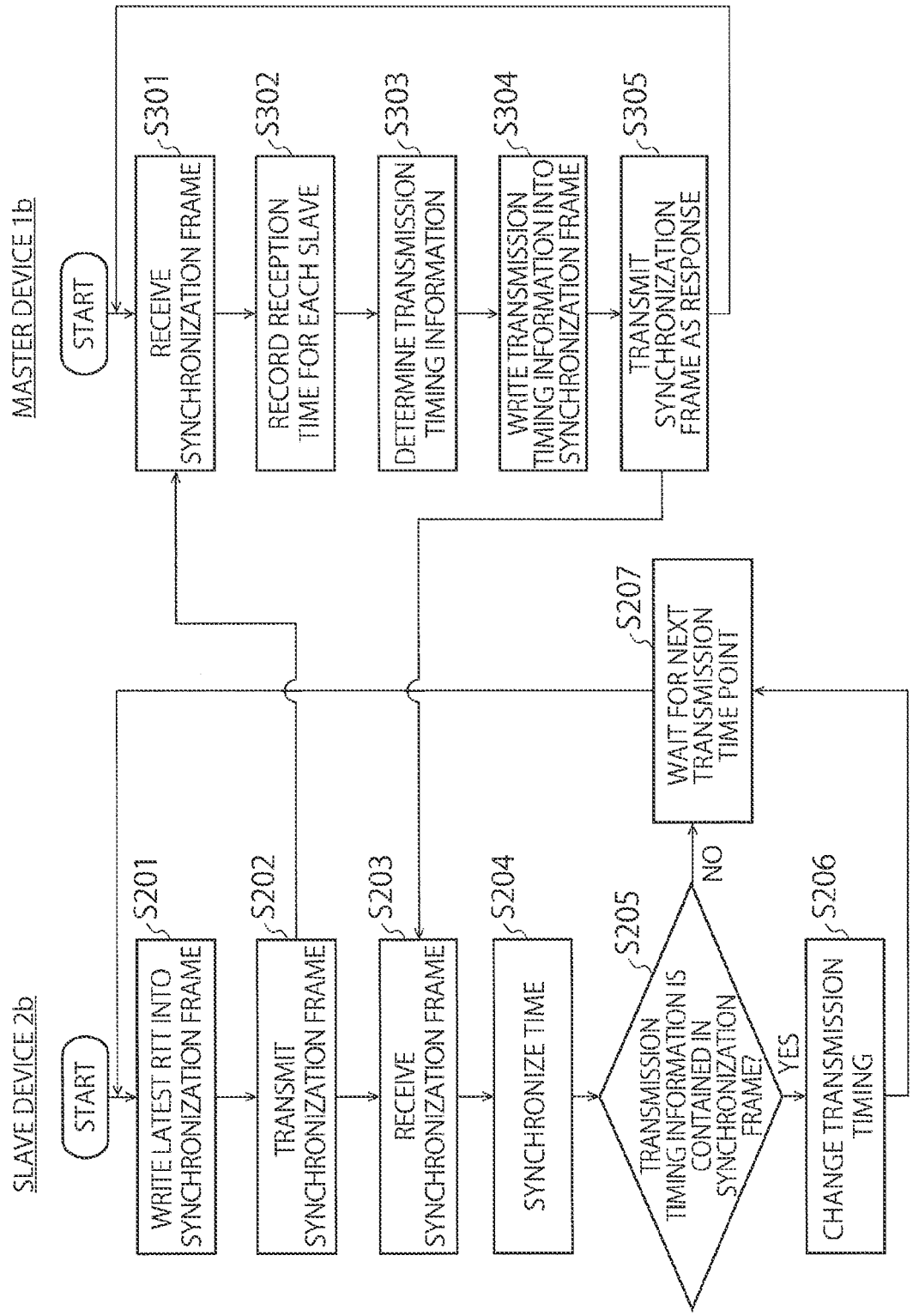
FIG. 7 is a flow chart showing an example of the operation of the communication system 10b in the second embodiment.

Subsequently, the operation of the communication system 10b in the second embodiment will be described with reference to FIG. 7. FIG. 7 is a flow chart showing an example of the operation of the communication system 10b in the second embodiment.

(Step S201) First, the second notifier 244 of the slave device 2b writes the latest RU into a synchronization frame to notify the latest RU to the master device 1b. In addition, in the case of the first synchronous sequence, the second notifier 244 of the slave device 2b writes a value indicating the first synchronous sequence into the synchronization frame.

(Step S202) Next, the second communicator 23b of the slave device 2b transmits the synchronization frame created in step S201 to the master device 1b at a transmission timing in accordance with a predetermined transmission phase and cycle.

(Step S301) Next, the first communicator 13 of the master device 1b receives the synchronization frame from the slave device 2b.

(Step S302) Next, whenever receiving the synchronization frame from the plurality of slave devices 2b-1, . . . , 2b-M, the recorder 141 of the master device 1b records in the storage 11 a time point (hereafter, referred to as a reception time point) at which this synchronization frame is received. The time points (hereafter, referred to as reception time points), at which the synchronization frames are received from the respective slave devices 2b-1, . . . , 2b-M, are thereby recorded.

(Step S303) Next, the determiner 142 of the master device 1b determines transmission timing information to specify the transmission timing of a synchronization frame, the transmission timing on which the slave devices 2b is to be instructed. Here, the transmission timing information is, for example, cycles, transmission phases, correction values for the cycles, correction values for the transmission phases or the amounts of time by which the current transmission timings are shifted, the combination of them, or the like.

Note that, in determining the transmission timing information, the determiner 142 may determine desired reception time points with which the reception time points of the request signals from all the slave devices 2b-1, . . . , 2b-M are at regular intervals. Here, the purpose of the desired reception time points is to receive the request signals at the time points, but instructing a certain slave device 2b-i (i is an integer from one through M) to shift the transmission time point to the desired reception time point does not necessarily make the reception time point of the request signal identical to the desired reception time point, due to the conditions of the communication network 4.

The determiner 142 may then perform a process of determining the difference between the desired reception time point of a request signal that is received from a certain slave device 2b-i and the reception time point of a request signal that has been received from the slave device 2b-i, as the transmission timing information on the slave device 2b-i. The determiner 142 may then perform this process on all the slave devices 2b-1, . . . , 2b-M.

Here, since the master device 1b records, for example, the time point at which a synchronization frame is received from each slave device 2b-i, the master device 1b may determine the desired reception time point of the synchronization frame from each slave device 2b-i such that desired reception time points of the respective slave devices 2b-i are at regular interval within the range of the cycle for the synchronization frame of the slave devices 2b.

In such a manner, the determiner 142 may determine the plurality of desired reception time points with which the reception time points of the respective request signals are at regular intervals, and determine, for each slave device 2b-i, the difference between a time point selected from among the plurality of desired reception time points in such a manner as to be different for each slave device 2b-i and the reception time point of the request signal that has already been received from the slave device 2*b-i* (hereafter, referred to as an actual reception time point), as the transmission timing information.

To make the reception time points of the respective request signals be at regular intervals, if the cycles for the request signals are the same among the plurality of slave devices 2*b*-1, . . . , 2*b*-M, the determiner 142 may determine the amount of shift in the transmission timing of the request signal for each slave device using the reception timings of the request signals from the plurality of slave devices 2*b*-1, . . . , 2*b*-M in the master device 1*b*, and a value obtained by dividing the cycle of these request signal by the number of the plurality of slave devices 2*b*-1, . . . , 2*b*-M.

More specifically, the determiner 142 may determine, for each slave device, a time by which the transmission timing of the request signal is shifted, as follows. The determiner 142 determines M desired reception time points based on, from a time point corresponding to a transmission phase of zero, "an interval of $\lambda/M$, which is a value obtained by dividing a cycle $\lambda$ for the request signal by the number M of the plurality of slave devices 2*b*-1, . . . , 2*b*-M. The determiner 142 then performs a series of processes of selecting one of the determined M desired reception time points, selecting one of M actual reception time points, and calculating the difference between the selected time points. The determiner 142 repeats this series of processes M times to obtain M differences. Note that, in the repetition, the desired reception time point once selected and the actual reception time point once selected are supposed not to be selected from the next time. The determiner 142 determines each of the obtained M differences as the amount of shift in the transmission timing of the request signal.

In addition, to make the reception time points of the respective request signals be at regular intervals, in the case where the cycles for the request signals are different among the plurality of slave devices 2*b*-1, . . . , 2*b*-M, the determiner 142 may determine the amount of shift in the transmission timings using the reception timing of the request signals from the plurality of slave devices 2*b*-1, . . . , 2*b*-M in the master device 1*b*, and a value obtained by dividing the greatest common divisor of the cycles for the request signals among the plurality of slave devices 2*b*-1, . . . , 2*b*-M by the number of the slave devices 2*b*-1, . . . , 2*b*-M.

More specifically, the determiner 142 may determine, for each slave device, the amount of shift in the transmission timing of the request signal as follows. The determiner 142 determines the M desired reception time points, from a time point corresponding to a transmission phase of zero, with an interval of $g/M$, which is a value obtained by dividing a greatest common divisor g of cycles $\lambda$ for the request signals by the number M of the plurality of slave devices 2*b*-1, . . . , 2*b*-M." The determiner 142 then performs the series of processes of selecting one of the determined M desired reception time points, selecting one of the M actual reception time points, and calculating the differences between the selected time points. The determiner 142 repeats this series of processes M times to obtain the M differences. Note that, in the repetition, the desired reception time point once selected and the actual reception time point once selected are supposed not to be selected from the next time. The determiner 142 determines each of the obtained M differences as the amount of shift in the transmission timing of the request signal.

In addition, the determiner 142 may determine the desired reception time point of each slave device 2*b-i* such that the actual reception time points of the synchronization frames from all the slave devices 2*b*-1, . . . , 2*b*-M do not overlap with one another and the desired reception time points do not overlap with one another. Then, the determiner 142 may perform a process of determining the difference between a desired reception time point that is determined for a certain slave device 2*b-i* and the reception time of the request signal that has already been received from the slave device 2*b-i*, as the transmission timing information for the slave device 2*b-i*. The determiner 142 may then perform this process on all the slave devices 2*b*-1, . . . , 2*b*-M.

In addition, in the case where no reception time points overlap with the reception time points of the other slave devices 2*b-i*, the determiner 142 may compare the value of RTT that the slave device 2*b-i* writes into the synchronization frame with the past RTT stored in the storage 11. This case assumes that, whenever the synchronization frame is received from the slave device 2*b-i*, the value of the RTT written in this synchronization frame is caused to be stored in the storage 11.

More specifically for example, if the value of a RTT that the slave device 2*b-i* has written into the synchronization frame is longer than the past RTT, the determiner 142 may change the cycle or the transmission phase by a predetermined value or a randomly determined value. In addition, the determiner 142 may determine a correction value for the transmission phase by performing binary search, defining the cycle for the synchronization frame as a maximum value, until the minimum value of the RTTs becomes the least. In addition, the determiner 142 may determine a correction value for the cycle by performing binary search, defining the current cycle as a maximum value, until the minimum value of the RTTs becomes the least.

In such a manner, the determiner 142 may compare the past round-trip delay time with the round-trip delay time contained in the request signal received by the second communicator 23*b*, and determine the transmission timing information to specify the transmission timing of the request signal according to the comparison result.

Here, when prolonging the cycle, the determiner 142 may calculate the estimated synchronizing-accuracy-improvement value according to Expression (4) every prolongation of the cycle. If the calculated estimated synchronizing-accuracy-improvement value is positive, the determiner 142 may use the prolonged cycle. If the improvement value is zero or less, which means that the synchronizing accuracy has not been improved, the determiner 142 does not use the prolonged cycle, but may use the original cycle, a predetermined value, or a randomly determined value, or may add the correction value for the cycle that has been determined through the binary search as described above to the original cycle, and calculate the estimated synchronizing-accuracy-improvement value again according to Expression (4). If the calculated estimated synchronizing-accuracy-improvement value is positive, the determiner 142 may use the prolonged cycle.

(Step S304) Next, the first notifier 143 of the master device 1*b* write the transmission timing information (e.g., at least one of the cycle, the transmission phase, the correction value for the cycle, the correction value for the transmission phase, and the amount of time by which the transmission timing is shifted) into the synchronization frame.

(Step S305) Next, the first communicator 13 of the master device 1*b* transmits the synchronization frame in the form of a response signal, as a response.

(Step S203) Next, the second communicator 23*b* of the slave device 2*b* receives the response signal containing the time synchronization information from the master device 1*b*, and passes this time synchronization information to the time synchronizer 243. Here, the time synchronization information contains the time point $t_2$ at which the master device 1*b* receives the synchronization frame and the time point $t_3$ at which the master device 1*b* transmits the synchronization frame.

Note that whenever the slave device 2*b* transmits a synchronization frame, the time synchronizer 243 of the slave device 2*b* causes the storage 21 to store the time point $t_1$ of the transmission, and whenever the slave device 2*b* receives the synchronization frame, causes the storage 21 to store the time point $t_4$ of the reception.

(Step S204) Next, the time synchronizer 243 calculates a communication delay from the master device 1*b* up to the slave device 2*b* according to Expression (1), and calculates the time difference "Δt" from the master device 1*b* according to Expression (2), and advances the time measured by the clock 27 by this time difference "Δt." Here, when advancing the time measured by the clock 27, the time may be advanced by the time difference "Δt" immediately, or the time may be gradually advanced over a predetermined time so as to be advanced by the time difference "Δt" after the predetermined time.

(Step S205) Next, the changer 241*b* determines whether transmission timing information is contained in the received synchronization frame.

(Step S206) If it is determined in step S205 that the transmission timing information is contained in the synchronization frame (YES in step S205), the changer 241*b* changes the transmission timing of the synchronization frame based on the transmission timing information. For example, in the case where the transmission timing information is a transmission phase and cycle, the changer 241*b* changes the transmission timing of the synchronization frame to the transmission timing that is determined from these transmission phase and cycle.

(Step S207) If it is determined in step S205 that no transmission timing information is contained in the synchronization frame (NO in step S205), the changer 241*b* waits for the next transmission time point that is determined from the transmission phase and cycle up to this point, the process returns to step S201, and the processes subsequent to the step S201 are repeated. This allows the time synchronizer 243 to adjust the time measured by the clock 27 using the transmission time point of a request signal after the transmission timing is changed and the reception time of this request signal in the master device 1*b*, and the transmission time point of the response signal in the master device 1*b* after the transmission timing is changed and the reception time of this response signal.

As seen from the above, in the master device 1*b* in the second embodiment, the first communicator 13 receives a request signal from the plurality of slave devices 2*b*-1, ..., 2*b*-M. The recorder 141 records a time point at which the first communicator 13 receives the request signals from the plurality of slave devices 2*b*-1, ..., 2*b*-M. The determiner 142 determines the pieces of transmission timing information to specify the transmission timings of the request signals for the plurality of respective slave devices 2*b*-1, ..., 2*b*-M such that the reception time points of the plurality of request signals received from the plurality of slave devices 2*b*-1, ..., 2*b*-M differ from one another. The first notifier 143 causes the individual pieces of transmission timing information to be contained in the response signals that differs from one another, and causes the individual response signals to be transmitted to the corresponding slave devices 2*b*-*i* from the first communicator 13.

In the slave device 2*b* in the second embodiment, the second communicator 23*b* transmits to the master device 1*b* a request signal to request a response from master device 1*b*, and receives from the master device 1*b* a response signal that is the response to the request signal. The changer 241*b* changes the transmission timing of the request signal based on the transmission timing information contained in the response signal. The time synchronizer 243 adjusts the time measured by the clock 27 using the transmission time point of a post-change request signal, which is the request signal after the changer 241*b* changes the transmission timing and the reception time point of the post-change request signal in the master device 1*b*, and the transmission time point of a post-change response signal, which is a response signal transmitted in response to the post-change request signal, in the master device 1*b* and the reception time point of the post-change response signal.

This allows the reception timings of the request signal from the plurality of slave devices 2*b*-1, ..., 2*b*-M to differ from one another. This can prevent frames transmitted by the plurality of slave devices 2*b*-1, ..., 2*b*-M from conflicting with one another, which can in turn prevent the constant delay. As a result, the plurality of slave devices 2*b*-1, ..., 2*b*-M are allowed to improve the estimation accuracy of the communication delay, which can in turn improve the accuracy of the time synchronization.

Third Embodiment

Subsequently, a third embodiment will be described. In the second embodiment, the master device collects the reception timings of the synchronization signal that the master device receives, and determines the transmission timings of the synchronization signals of the slaves using the collected reception timings such that the reception timings of the synchronization signals from the slave devices differ from one another. In contrast, in the third embodiment, it is a central control device, rather than the master device, that determines the transmission timings of the synchronization signals of the slaves.

Figure 8:
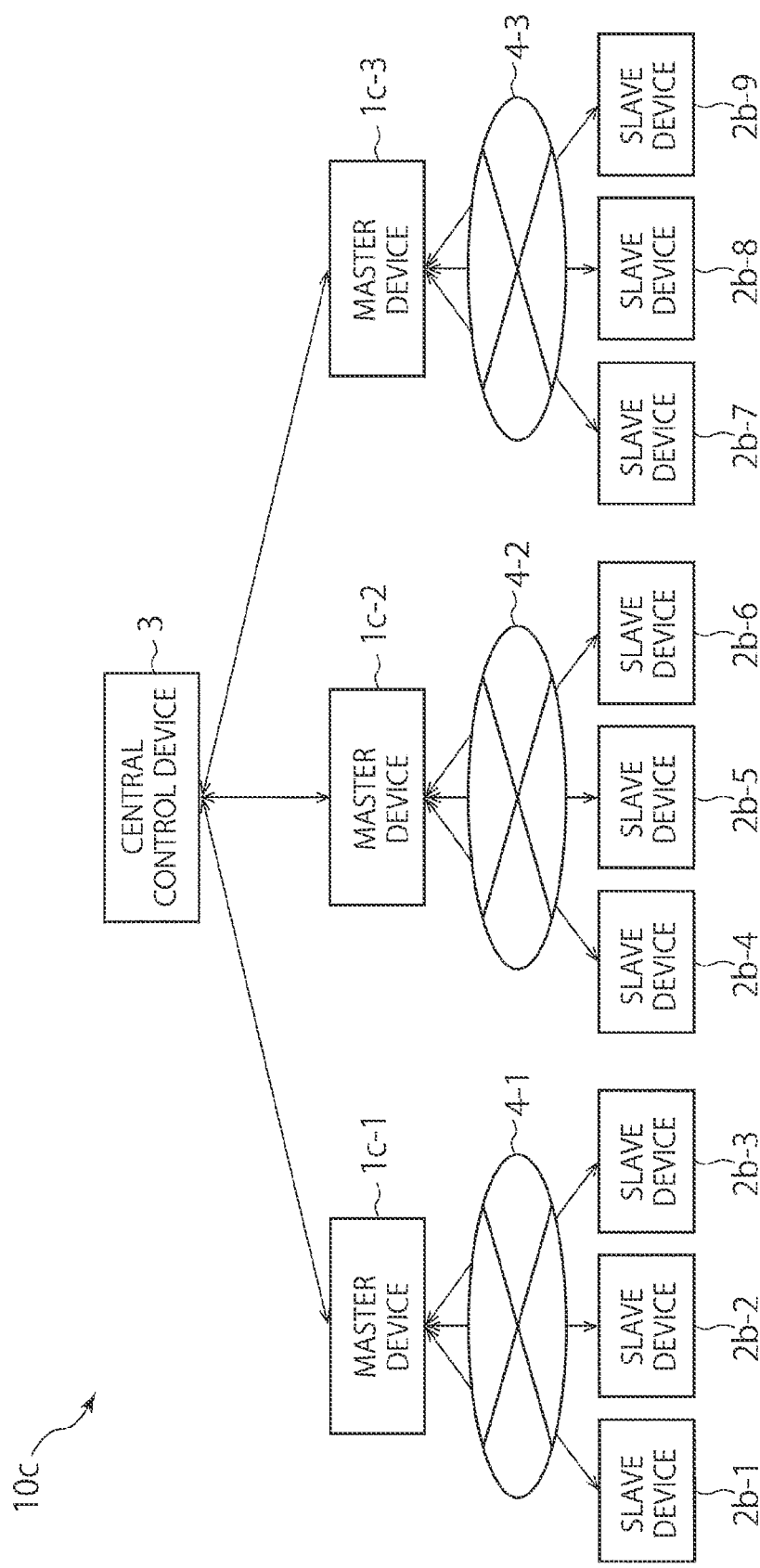
FIG. 8 is a configuration diagram of a communication system 10c in a third embodiment.

Subsequently, the configuration of a communication system 10*c* in the third embodiment will be described with reference to FIG. 8. FIG. 8 is a diagram showing the configuration of the communication system 10*c* in the third embodiment. As shown in FIG. 8, the communication system 10*c* includes master devices (first communication devices) 1*c*-1, ..., 1*c*-3, slave devices (second communication devices) 2*b*-1, ..., 2*b*-9, and a central control device (third communication device) 3. The slave devices 2*b*-1, ..., 2*b*-3 are connected to the master device 1*c*-1 via a communication network 4-1, and communicate with the master device 1*c*-1.

Similarly, the slave devices 2*b*-4, ..., 2*b*-6 are connected to the master device 1*c*-2 via a communication network 4-2, and communicate with the master device 1*c*-2. Similarly, slave devices 2*b*-7, ..., 2*b*-9 are connected to the master device 1*c*-3 via a communication network 4-3, and communicate with the master device 1*c*-3. The master devices 1*c*-1, 1*c*-2, and 1*c*-3 are connected to the central control device 3, and communicate with the central control device 3.

The master device 1*c*-1 receives synchronization frames from the slave devices 2*b*-1, ..., 2*b*-3, and collects the reception timings of these synchronization frames and RTTs contained in the received synchronization frames. The master device 1*c*-1 then notifies the collected reception timings and the RTTs to the central control device 3.

Similarly, the master device 1*c*-2 receives synchronization frames from the slave devices 2*b*-4, ..., 2*b*-6, and collects the reception timings of these synchronization frames and RTTs contained in the received synchronization frames. The master device 1c-2 then notifies the collected reception timings and the RTTs to the central control device 3.

Similarly, the master device 1c-3 receives synchronization frames from the slave devices 2b-7, ..., 2b-9, and collects the reception timings of these synchronization frames and RTTs contained in the received synchronization frames. The master device 1c-3 then notifies the collected reception timings and the RTTs to the central control device 3. Hereafter, the master devices 1c-1, 1c-2, and 1c-3 are collectively referred to as master devices 1c.

Figure 9:
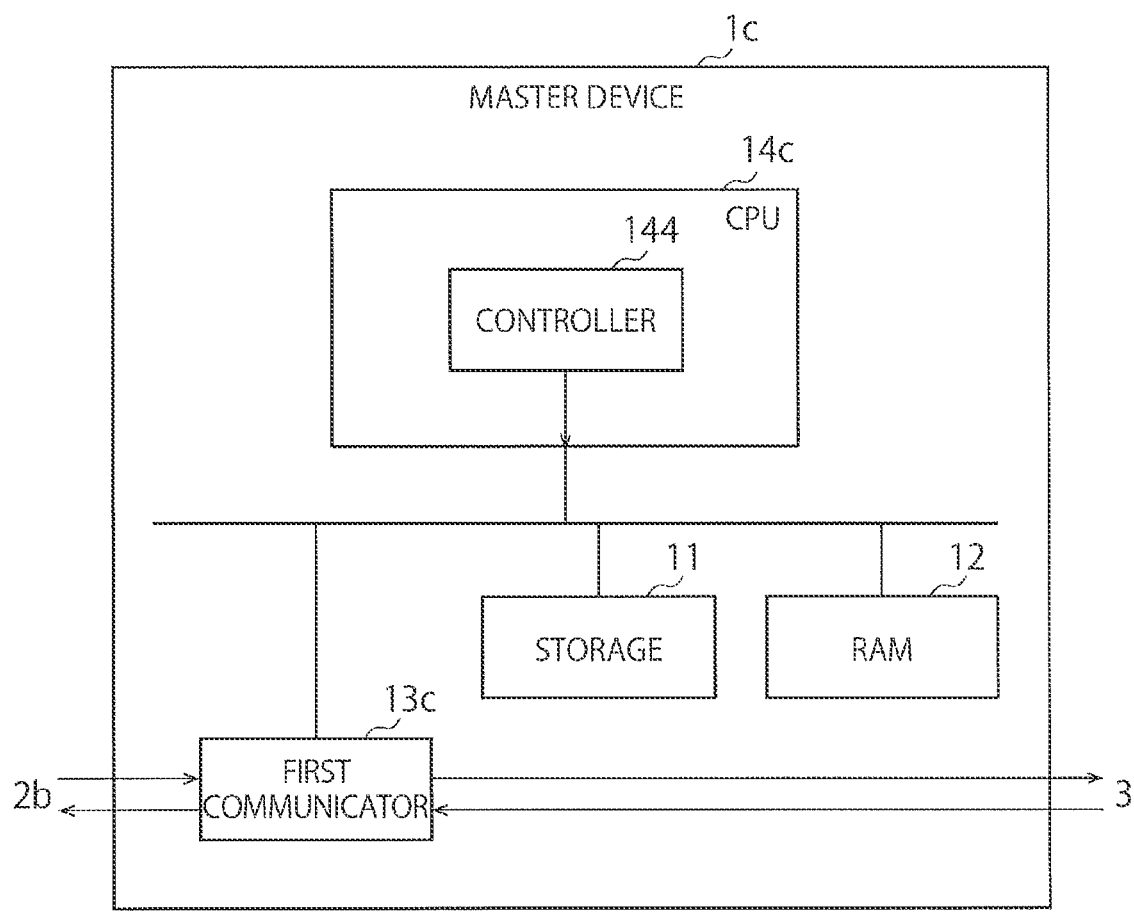
FIG. 9 is a configuration diagram of a master device 1c in the third embodiment.

Subsequently, the configuration of the master device 1c in the third embodiment will be described with reference to FIG. 9. FIG. 9 is a diagram showing the configuration of the master device 1c in the third embodiment. As shown in FIG. 9, the master device 1c includes a storage 11, a RAM 12, a first communicator 13c, and a CPU 14c.

In the storage 11, various programs to be executed by the CPU 14c are saved.

The RAM 12 stores information temporarily.

The first communicator 13c communicates with the corresponding slave device 2b-k (k is an integer from one through nine) via the communication network 4c-j (j is an integer from one through three). In addition, the first communicator 13c communicates with the central control device 3. For example, the first communicator 13c receives request signals (e.g., synchronization frames) from a plurality of the respective slave devices 2b-k, and transmits the reception timings of these request signals to the central control device 3.

In addition, the first communicator 13c receives the plurality of pieces of transmission timing information from the central control device 3, and transmits the response signals containing the pieces of transmission timing information that are different from one another to the corresponding slave devices 2b-k.

The CPU 14c reads a program from the storage 11 into the RAM 12 and executes it to function as a controller 144.

The controller 144 controls the first communicator 13c. For example, the controller 144 collects the reception timings of the synchronization frames from the slave devices 2b-k that are connected therewith via the communication network, and RTTs contained in the received synchronization frame. The controller 144 then causes the first communicator 13c to transmit a message containing the collected reception timings and the RTTs, to the central control device 3.

Note that the configuration of each of the slave devices 2b-1, ..., 2b-9 is similar to the configuration of each slave device 2b in the second embodiment shown in FIG. 6, and thus will not be described.

Figure 10:
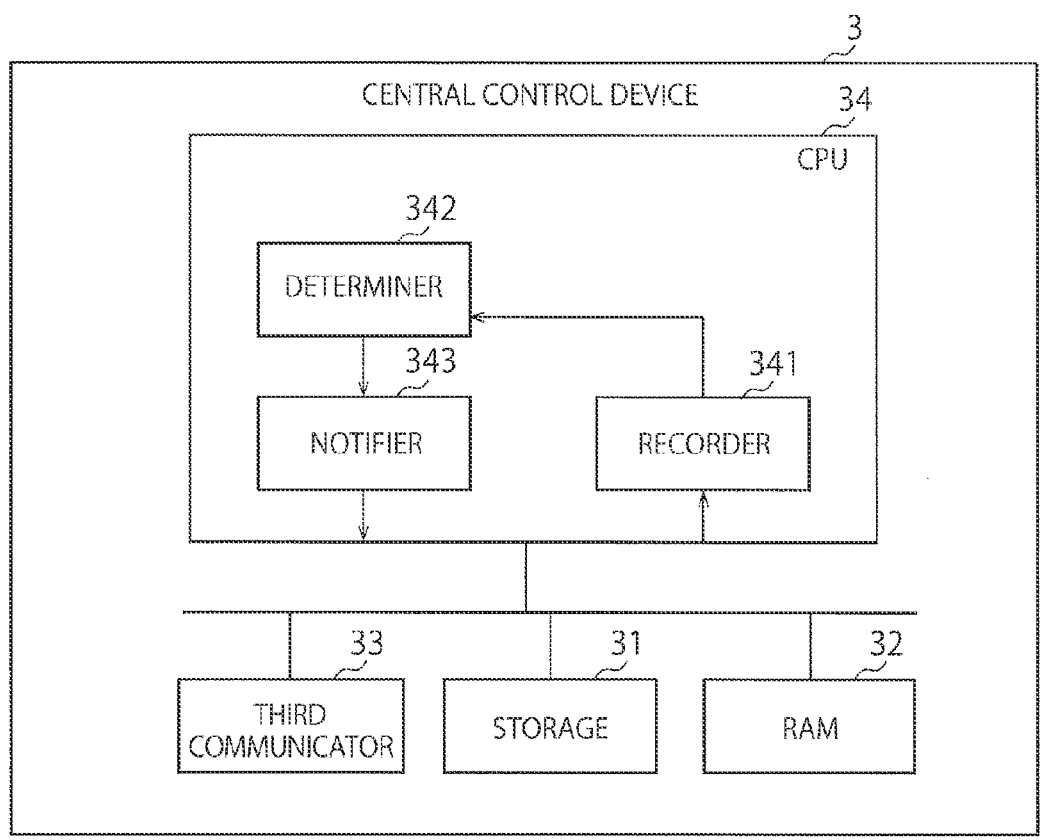
FIG. 10 is a configuration diagram of a central control device 3 in the third embodiment.

Subsequently, the configuration of the central control device 3 will be described with reference to FIG. 10. FIG. 10 is a diagram showing the configuration of the central control device 3 in the third embodiment. As shown in FIG. 10, the central control device 3 includes a storage 31, a RAM 32, a third communicator 33, and a CPU 34. All or some of the blocks of the central control device 3 may be configured by one or a plurality of circuitry as one example. As one example, the communicator 33 may be configured by communication circuitry, and the CPU 34 may be configured by processing circuitry. The communication circuitry and the processing circuitry may be same physical circuitry or different physical circuitry each other. Other configuration examples than those described herein are possible. The term "circuitry" may indicate one circuit, a plurality of circuits, or a system of circuits.

In the storage 31, various programs to be executed by the CPU 34 are saved.

The RAM 32 stores information temporarily.

The third communicator 33 communicates with the master devices 1c-1, 1c-2, and 1c-3. For example, the third communicator 33 acquires the reception timings at which the individual master devices 1c-j receives the request signals from the plurality of slave devices 2b-3(j−1)+1 to 2b-(3j), from the individual master devices 1c-1, 1c-2, and 1c-3 by way of communication. Here, the request signals are signals to request responses from the master devices 1c-j. In addition, the third communicator transmits each of the plurality of pieces of transmission timing information determined by a determiner 342, which will be hereafter described, to the master device 1c-j that can communicate with the corresponding slave device 2b-k.

The CPU 34 reads a program from the storage 31 to the RAM 32 and executes it to function as a recorder 341, the determiner 342, and a notifier 343.

The recorder 341 records the reception timings contained in the messages that the third communicator 33 receives from master devices 1c-1, 1c-2, and 1c-3, in the storage 31.

The determiner 342 determines, based on the recorded reception timings, the pieces of transmission timing information to specify the transmission timings of the request signals that the slave devices 2b-k transmit, respectively, such that the reception time points of the plurality of request signals that the plurality of master devices 1c-1, 1c-2, and 1c-3 receive from the plurality of the slave devices 2b-k differ from one another.

The notifier 343 causes the third communicator 33 to transmit the respective pieces of transmission timing information determined by the determiner 342, to the master device 1c-j that can communicate with the corresponding slave devices 2b-k.

Figure 11:
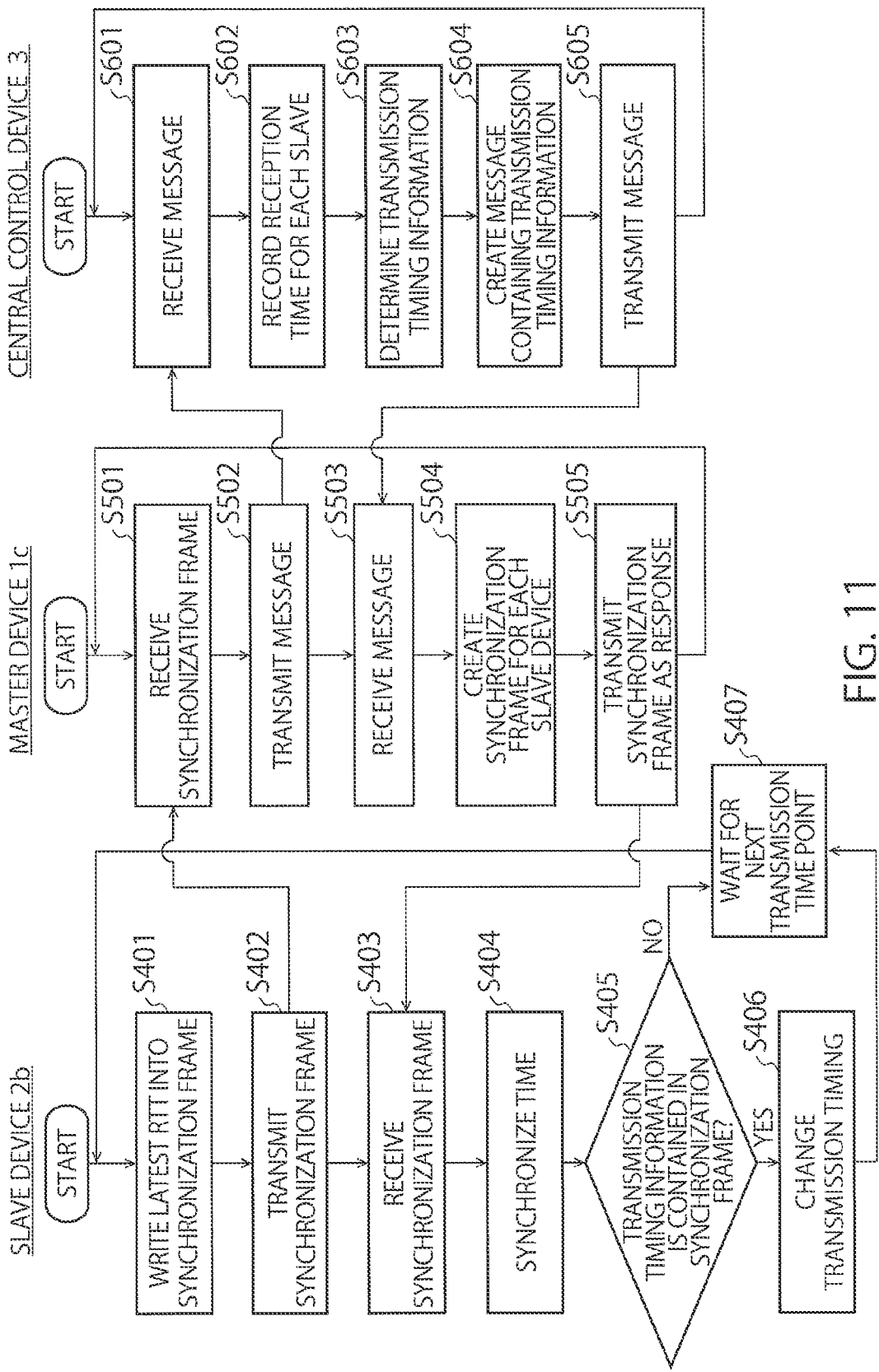
FIG. 11 is a flow chart showing an example of the operation of a communication system 10c in the third embodiment.

Subsequently, the operation of the communication system 10c in the third embodiment will be described with reference to FIG. 11. FIG. 11 is a flow chart showing an example of the operation of the communication system 10c in the third embodiment. All steps S401 to S407 in the slave device 2b are similar to all steps S201 to S207 in FIG. 7, and thus will not be described.

(Step S501) First, the first communicator 13c of each master device 1c-j receives the synchronization frames being the request signals from the slave devices 2b.

(Step S502) Next, the first communicator 13c of each master device 1c-j transmits a message containing the collected reception time points and the RTTs to the central control device 3.

(Step S601) Next, the third communicator 33 of the central control device 3 receives the messages from the master devices 1c-1, ..., 1c-3.

(Step S602) Next, the recorder 341 of the central control device 3 records reception time points t1, t2, and t3 of the request signals that the master device 1c-1 has received from the slave devices 2b-1, ..., 2b-3, in the storage 31. Similarly, the recorder 341 of the central control device 3 records reception time points t4, t5, and t6 of the request signals that the master device 1c-2 has received from the slave devices 2b-4, ..., 2b-6, in the storage 31. Similarly, the recorder 341 of the central control device 3 records reception time points t7, t8, and t9 of the request signals that the master device 1c-3 has received from the slave devices 2b-7, ..., 2b-9, in the storage 31.

(Step S603) Next, the determiner 342 of the central control device 3 determines the pieces of transmission timing information to specify the transmission timings of the request signals from the respective slave devices 2b-k. At that point, the determiner 342 determines, based on the plurality of reception timings (e.g., the reception time points t1, ..., t9), the pieces of transmission timing information to specify the transmission timings at which the slave devices 2b-k transmit the request signals, respectively, such that the reception time points (here, the number thereof is nine) of the plurality of request signals that the plurality of master devices 1c-1, ..., 1c-3 receives from the plurality of second communication devices differ from one another.

For example, the determiner 342 may determine the differences between the nine desired reception time points being at regular intervals and the reception time points t1, ..., t9 of the request signals that the master devices 1c-j have already received as the pieces of transmission timing information. Alternatively, the determiner 342 may determine the differences between the nine desired reception time points that do not overlap with the other recorded reception time points and the reception time points t1, ..., t9 of the request signals that the master devices 1c-j have already received as the pieces of transmission timing information. Here, the purpose of the desired reception time points is to receive the request signals at the time points, but instructing the slave devices to shift the transmission time points to the desired reception time points does not necessarily make the reception time points of the request signals identical to the desired reception time points, due to the conditions of the communication networks 4-1, ..., 4-3.

In addition, also in the case where reception time points differ from one another, the determiner 342 may change the pieces of transmission timing information. For example, the determiner 342 may compare the RU that the slave device 2b-k writes into a synchronization frame with the recorded past RTT. Then, if the RTT that the slave device 2b-k writes into the synchronization frame is longer than the recorded past RTT, the determiner 342 may change the cycle or the transmission phase by a predetermined value or a randomly determined value. Alternatively, the determiner 342 may determine a correction value for the transmission phase by performing binary search, defining the cycle for the synchronization frame as a maximum value, until the minimum value of the RTTs becomes the least. Alternatively, the determiner 342 may determine a correction value for the cycle, by performing binary search, defining the cycle for the synchronization frame as a maximum value, until the minimum value of the RTTs becomes the least.

In such a manner, the second communicator 23b of the slave device 2b-k may transmit a round-trip delay time from the transmission of a request signal up to the reception of a response signal, to the central control device 3. The determiner 342 of the central control device 3 may then compare the round-trip delay time transmitted by the second communicator 23b with the past round-trip delay time, and determine, according to the comparison result, the piece of transmission timing information to specify the transmission timing of the request signal.

Here, when prolonging the cycle, the determiner 342 may calculate the estimated synchronizing-accuracy-improvement value according to Expression (4) every prolongation of the cycle. If the calculated estimated synchronizing-accuracy-improvement value is positive, the determiner 342 may use the prolonged cycle. If the improvement value is zero or less, which means that the synchronizing accuracy has not improved, the determiner 342 does not use the prolonged cycle, but may use the original cycle, a predetermined value, or a randomly determined value, or may add the correction value for the cycle that has been determined through the binary search as described above to the original cycle, and calculate the estimated synchronizing-accuracy-improvement value again according to Expression (4). If the calculated estimated synchronizing-accuracy-improvement value is positive, the determiner 342 may use the prolonged cycle.

(Step S604) Next, the notifier 343 of the central control device 3 creates a message containing the pieces of transmission timing information to specify the transmission timings of the slave devices 2b-1, ..., 2b-9.

(Step S605) Next, the third communicator 33 of the central control device 3 transmits the created message to each master device 1c-j.

(Step S503) Next, the first communicator 13c of each master device 1c-j receives the message.

(Step S504) Next, the controller 144 of each master device 1c-j reads the piece of transmission timing information from the message, and creates, for each slave device 2b-k, a synchronization frame containing the piece of transmission timing information to specify the transmission timing of the slave device 2b-k.

(Step S505) Next, the first communicator 13c of each master device 1c-j transmits the created synchronization frame for each slave device 2b-k, to the corresponding to slave device 2b-k. The synchronization frame is thereby transmitted to each slave device 2b-k, the synchronization frame containing the piece of transmission timing information to specify the transmission timing of the slave device.

As described above, in the central control device 3 in the third embodiment, the third communicator 33 acquires the reception timings at which the individual master device 1c-j receives the request signals from the plurality of the slave devices 2b-k, from the individual master devices 1c-j by way of communication. The determiner 342 determines, based on the plurality of reception timings, the pieces of transmission timing information to specify the transmission timings of the request signals transmitted by the individual slave device 2b-k, such that the reception time points of the plurality of request signals that the plurality of master devices 1c-j receive from the plurality of the slave devices 2b-k differ from one another. The notifier 343 causes the third communicator 33 to transmit the pieces of transmission timing information to the individual master device 1c-j.

In addition, in the master device 1c-j in the third embodiment, the first communicator 13c receives the request signals from the plurality of the individual slave devices 2b-k, and transmits the reception timings of these request signals to the central control device 3. In addition, the first communicator 13c receives the plurality of pieces of transmission timing information from the central control device 3, and transmits the respective response signals containing the pieces of transmission timing information that are different from one another, to the corresponding slave devices 2b-k.

In addition, the slave device 2b-k in the third embodiment, the second communicator 23b transmits a request signal to the master device 1c-j, and receives a response signal from the master device 1c-j.

The changer 241b changes the transmission timing of the request signal based on the transmission timing information.

This allows the central control device 3 to determine the transmission timings of the slave devices 2b-k to make the reception timings of the request signals from the plurality of slave devices 2b-1, ..., 2b-9 different from one another. The overlaps of the frames transmitted by the plurality of slave devices 2b-1, ..., 2b-9 thus can be avoided, the plurality of slave devices 2b-1, ..., 2b-9 that are distributed and synchronized under the plurality of master devices, which can in turn avoid a constant delay. As a result, the plurality of slave devices 2b-1, ..., 2b-9 are allowed to improve the estimation accuracy of the communication delay, which can in turn improve the accuracy of the time synchronization.

Note that the slave device 2 in the first embodiment can be implemented by means of, for example, a general-purpose computer device as basic hardware. That is, the changer 241, the comparator 242, and the time synchronizer 243 can be implemented in such a manner as to cause the processor provided in the above-described computer device to execute the programs. At this point, the slave device 2 may be implemented by the installation of the above-described programs into the computer device in advance, or may be implemented in such a manner as to cause the above-described programs to be stored in a storage medium such as a CD-ROM, or distributed via a network, and to install these programs into the computer device as appropriate. In addition, the changer 241, the comparator 242, and the time synchronizer 243 can be implemented in such a manner as to use, as appropriate, a memory or a hard disk that is built in or externally attached to the above-described computer device, or a storage medium such as a CD-R, CD-RW, DVD-RAM, and DVD-R.

In addition, the master device 1b or the slave devices 2b in the second embodiment can be implemented by means of, for example, a general-purpose computer device as basic hardware. That is, in the case of the master device 1b, the recorder 141, the determiner 142, and the first notifier 143 can be implemented in such a manner as to cause the processor provided in the above-described computer device to execute the programs. In contrast, in the case of the slave devices 2b, the changer 241b, the time synchronizer 243, and the second notifier 244 can be implemented in such a manner as to cause the processor provided in the above-described computer device to execute the programs. At this point, the master device 1b or the slave devices 2b may be implemented by the installation of the above-described program into the computer device in advance, or may be implemented in such a manner as to cause the above-described programs to be stored in a storage medium such as a CD-ROM, or distributed via a network, and to install these programs into the computer device as appropriate. In addition, the recorder 141, the determiner 142, and the first notifier 143, or the changer 241b, the time synchronizer 243, and the second notifier 244 can be implemented in such a manner as to use, as appropriate, a memory or a hard disk that is built in or externally attached to the above-described computer device, or a storage medium such as a CD-R, CD-RW, DVD-RAM, and DVD-R.

In addition, the master devices 1c, the slave devices 2b, or the central control devices 3 in the third embodiment can be implemented by means of, for example, a general-purpose computer device as basic hardware. That is, in the case of the master devices 1c, the controller 144 can be implemented in such a manner as to cause the processor provided in the above-described computer device to execute the programs. In contrast, in the case of the slave devices 2b, the time synchronizer 243, the changer 241b, and the second notifier 244 can be implemented in such a manner as to cause the processor provided in the above-described computer device to execute the programs. In contrast, in the case of the central control device 3, the recorder 341, the determiner 342, and the notifier 343 can be implemented in such a manner as to cause the processor provided in the above-described computer device to execute the programs.

At this point, the master devices 1c, the slave devices 2b, or the central control device 3 can be implemented by the installation of the above-described program into the computer device in advance, or may be implemented in such a manner as to cause the above-described program to be stored in a storage medium such as a CD-ROM, or distributed via a network, and to install these programs into the computer device as appropriate. In addition, the controller 144, or the time synchronizer 243, the changer 241b, and the second notifier 244, or the recorder 341, the determiner 342, and the notifier 343 can be implemented in such a manner as to use, as appropriate, a memory or a hard disk that is built in or externally attached to the above-described computer device, or a storage medium such as a CD-R, CD-RW, DVD-RAM, and DVD-R.

Also, the above-stated hardware configuration is one example and the master device, the slave device and the central control device according to an embodiment can be realized by circuitry. The circuitry may be an integrated circuit such as a LSI (Large Scale Integration) or an IC (Integrated Circuit) chip set. The circuitry may comprise one circuit or a plurality of circuits or a system of circuits. Each function block in the master device, the slave device and the central control device can be realized by respective processors, or a part or all of the function blocks can be integrated and realized by one processor. A means for the integrating the part or all of the function blocks is not limited to the LSI and may be dedicated circuitry or a general-purpose processor.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, one or more microprocessors in conjunction with a DSP core.

As another example, the term "memory" may encompass any electronic component which can store electronic information. The "memory" may refer to various types of media such as random access memory (RAM), read-only memory (ROM), programmable read-only memory (PROM), erasable programmable read only memory (EPROM), electrically erasable PROM (EEPROM), non-volatile random access memory (NVRAM), flash memory, magnetic or optical data storage, which are readable by a processor. It can be said that the memory electronically communicates with a processor if the processor read and/or write information for the memory. The memory may be integrated to a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A communication device comprising:
a clock to measure time;
communication circuitry to transmit a request signal to the other communication device in a certain cycle, and to receive a response signal that is transmitted in response to the request signal, from the other communication device;

processing circuitry to:
change a transmission timing of the request signal;
compare first round-trip delay time with second round-trip delay time,
    the first round-trip delay time relating to a time period obtained by subtracting signal processing time required in the other communication device after reception of a first request signal until transmission of a first response signal, from a time period after the transmission of the first request signal until the reception of the first response signal, the first request signal being the request signal before change of the transmission timing, and the first response signal being the response signal transmitted in response to the first request signal,
    the second round-trip delay time relating to a time period from transmission of a second request signal until reception of a second response signal, the second request signal being the request signal after change of the transmission timing, the second response signal being the response signal transmitted in response to the second request signal, and the second response signal containing information representing a reception time point of the second request signal in the other communication device and information representing a transmission time point of the second response signal from the other communication device; and
if a result of comparison by the processing circuitry shows that the second round-trip delay time is shorter than the first round-trip delay time, adjust the time measured by the clock using a transmission time point of the second request signal and the reception time point of the second request signal in the other communication device, and the transmission time point of the second response signal from the other communication device and a reception time point of the second response signal.

2. The communication device according to claim 1, wherein if the result of comparison by the processing circuitry shows that the second round-trip delay time is not shorter than the first round-trip delay time, the processing circuitry changes the transmission timing of the request signal again.

3. The communication device according to claim 1, wherein
    the communication circuitry repeats the transmission of the first request signal and the reception of the first response signal a plurality of times, and repeats the transmission of the second request signal and the reception of the second response signal a plurality of times,
    the first response signal contains information representing a reception time point of the first request signal in the other communication device and information representing a transmission time point of the first response signal from the other communication device, and
    the processing circuitry determines, as the first round-trip delay time, a sum of a minimum value of differences between transmission time points of the first request signals and reception time points of the first request signals in the other communication device, and a minimum value of differences between transmission time points of the first response signals from the other communication device and reception time points of the first response signals, and determines, as the second round-trip delay time, a sum of a minimum value of differences between transmission time points of the second request signals and reception time points of the second request signals in the other communication device, and a minimum value of differences between transmission time points of the second response signals from the other communication device and reception time points of the second response signals.

4. The communication device according to claim 3, wherein
    the processing circuitry determines whether synchronizing accuracy is improved based on a decrement from the first round-trip delay time to the second round-trip delay time, an amount of cycle prolongation, accuracy of a crystal oscillator included in the communication device if the processing circuitry prolongs a cycle for the request signal, and
    the processing circuitry changes the cycle for the request signal again if the processing circuitry determines that the synchronizing accuracy is not improved.

5. The communication device according to claim 4, wherein the processing circuitry adjusts the clock if the processing circuitry determines that the synchronizing accuracy is improved.

6. The communication device according to claim 3, wherein the processing circuitry determines a time difference from the other communication device using the transmission time point of the second request signal and the reception time point of the second request signal in the other communication device, and the transmission time point of the second response signal from the other communication device and the reception time point of the second response signal, and adjusts the clock using the determined time difference if the second round-trip delay time is shorter than the first round-trip delay time.

7. The communication device according to claim 1, wherein the processing circuitry changes at least one of a phase in transmitting the request signal and the cycle to change the transmission timing of the request signal.

8. A communication system comprising: a first communication device; and a plurality of second communication devices that communicate with the first communication device, wherein
    the first communication device comprises
    a first communication circuitry to receive request signals from the plurality of second communication devices, respectively;
    a first processing circuitry to:
    record time points at which the first communication circuitry receives respective request signals from the plurality of second communication devices;
    determine pieces of transmission timing information to specify transmission timings of the request signals from the plurality of respective second communication devices such that reception time points of the plurality of request signals received from the plurality of second communication devices differ from one another; and
    cause the pieces of transmission timing information to be contained in respective response signals that are different from one another, and to cause the first communication circuitry to transmit the respective response signals to the corresponding second communication devices, and
    the second communication devices each comprise:
    a clock to measure time;
    a second communication circuitry to transmit to the first communication device the request signal to request a response from the first communication device, and to receive from the first communication device the response signal that is transmitted in response to the request signal;

a second processing circuitry to:

change the transmission timing of the request signal based on a piece of transmission timing information contained in the response signal; and adjust the time measured by the clock using a transmission time point of a post-change request signal that is the request signal after the second processing circuitry changes the transmission timing and a reception time point of the post-change request signal in the other communication device, and a transmission time point of a post-change response signal, from the other communication device, that is the response signal transmitted in response to the post-change request signal and a reception time point of the post-change response signal.

9. The communication system according to claim 8, wherein the first processing circuitry determines a plurality of desired reception time points with which the reception time points of the respective request signals are made to be at regular intervals, and determines, for each second communication device, a difference between a time point that is selected from among the plurality of desired reception time points so as to be different for each second communication device and the reception time point of the request signal transmitted by the second communication device, as the piece of transmission timing information.

10. The communication system according to claim 9, wherein the first processing circuitry determines, for each second communication device, an amount of shift in the transmission timing as the piece of transmission timing information, using reception timings of the request signals from the plurality of second communication devices in the first communication device, and a value obtained by dividing a cycle for the request signals by a number of the second communication devices if the plurality of second communication devices are identical in the cycle for the request signals.

11. The communication system according to claim 9, wherein the first processing circuitry determines an amount of shift in the transmission timing as the piece of transmission timing information, using reception timings of the request signals from the plurality of second communication devices in the first communication device, and a value obtained by dividing a greatest common divisor of cycles for the request signals among the plurality of second communication devices by a number of the second communication devices if the cycles for the request signals differ among the plurality of second communication devices.

12. The communication system according to claim 8, wherein each of the response signals contains information representing the reception time point of the request signal in the first communication device and a transmission time point of the response signal from the first communication device, the second processing circuitry of each of the second communication devices is further to calculate round-trip delay time using a transmission time point of the request signal, the reception time point of the request signal, a transmission time point of the response signal, and a reception time point of the response signal, to cause the calculated round-trip delay time to be contained in the request signal, and to cause the second communication circuitry to transmit the request signal to the first communication device, and the determiner compares past round-trip delay time with the round-trip delay time contained in the request signal transmitted by the second communication circuitry, and determines a piece of transmission timing information to specify transmission timing of the request signal according to a result of the comparison.

13. A communication system comprising: a plurality of first communication devices; a plurality of second communication devices each communication with one of the plurality of first communication devices; and a third communication device that communicates with the plurality of first communication devices, wherein the third communication device comprises a third communication circuitry to acquire, from each first communication device by way of communication, reception timings at which each first communication device receives, from the plurality of second communication devices, request signals to request responses from the first communication device; and a third processing circuitry to determine, based on the plurality of reception timings, a plurality of pieces of transmission timing information to specify transmission timings of request signals transmitted by the respective second communication devices, such that reception time points of a plurality of request signals received by the plurality of first communication devices from the plurality of second communication devices differ from one another, wherein the third communication circuitry transmits each of the plurality of pieces of transmission timing information determined by the third processing circuitry to one of the first communication devices that can communicate with the corresponding second communication device, the first communication devices each comprise a first communication circuitry to receive the request signals from the plurality of respective second communication devices, to transmit the reception timings of the respective request signals to the third communication device, to receive the plurality of pieces of transmission timing information from the third communication devices, and to transmit each of response signals containing the pieces of transmission timing information that differ from one another to the corresponding second communication devices, and the second communication devices each comprise a second communication circuitry to transmit the request signal to one of the first communication devices, and to receive the response signal from the one first communication device; and a second processing circuitry to change the transmission timing of the request signal based on the piece of transmission timing information.

14. The communication system according to claim 13, wherein the second communication circuitry of each of the second communication devices transmits to the third communication device round-trip delay time from transmission of the request signal up to reception of the response signal, and the third processing circuitry compares the round-trip delay time transmitted by the second communication circuitry with past round-trip delay time, and determines a piece of transmission timing information to specify a transmission timing of the request signal according to a result of the comparison.

* * * * *